United States Patent
Li et al.

(10) Patent No.: US 8,670,452 B2
(45) Date of Patent: Mar. 11, 2014

(54) WIRELESS ADAPTOR AND METHOD FOR TRANSMITTING AND RECEIVING MESSAGE

(75) Inventors: Qiang Li, Taipei (TW); Yen-Jung Chang, Taipei (TW); Shiwei Wang, Taipei (TW)

(73) Assignee: Delta Network, Inc., Neihu, Taipei (TW)

( * ) Notice: Subject to any disclaimer, the term of this patent is extended or adjusted under 35 U.S.C. 154(b) by 387 days.

(21) Appl. No.: 12/901,064

(22) Filed: Oct. 8, 2010

(65) Prior Publication Data

US 2011/0026448 A1    Feb. 3, 2011

Related U.S. Application Data

(63) Continuation of application No. 11/311,087, filed on Dec. 19, 2005, now abandoned.

(30) Foreign Application Priority Data

Mar. 4, 2005    (TW) ............................. 94106722 A

(51) Int. Cl.
*H04L 12/28* (2006.01)
*H04L 12/56* (2011.01)

(52) U.S. Cl.
USPC ........................................................ 370/401

(58) Field of Classification Search
None
See application file for complete search history.

(56) References Cited

U.S. PATENT DOCUMENTS

| 2003/0112810 A1 | 6/2003 | Nakabayashi et al. | |
|---|---|---|---|
| 2004/0190477 A1* | 9/2004 | Olson et al. | 370/338 |
| 2006/0209773 A1* | 9/2006 | Hundal et al. | 370/338 |

FOREIGN PATENT DOCUMENTS

| JP | 2003249937 | 9/2003 |
|---|---|---|
| JP | 2004007411 | 1/2004 |
| JP | 2006-050393 | 2/2006 |
| JP | 2006-108732 | 4/2006 |

OTHER PUBLICATIONS

English Translation of Notification of the First Office Action Issued on May 20, 2008 to Counterpart Japanese Patent Application No. 2006-039339.
English Translation of Notification of the First Office Action Issued on Oct. 17, 2008 to Counterpart Japanese Patent Application No. 2006-039339.

(Continued)

*Primary Examiner* — Chirag Shah
*Assistant Examiner* — Srinivasa Reddivalam
(74) *Attorney, Agent, or Firm* — Volpe and Koenig, P.C.

(57) ABSTRACT

A method for transmitting and receiving a message is provided. The method includes steps of providing a bridge device having a bridge hardware address and a first end, receiving a first message including a first hardware address, a first protocol address and a second protocol address from the first end, recording the first hardware address and the first protocol address on a table, replacing the first hardware address with the bridge hardware address, transmitting the first message to a second end having a second hardware address corresponding to the second protocol address; transmitting a second message including the first protocol address, the second protocol address, the bridge hardware address, and the second hardware address from the second end to the bridge device, replacing the bridge hardware address with the first hardware address according to the table; and transmitting the second message to the first end.

15 Claims, 3 Drawing Sheets

(56) References Cited

OTHER PUBLICATIONS

Sidorovs, A. et al. "Smart ARP: Merging IP and MAC Addressing for Low-cost Gigabit Ethernet Networks". Computer Networks, Elsevier Science Publishers B.V., Amsterdam, NL, vol. 31, No. 21 (Nov. 10, 1999), pp. 2193-2204. XP004404642 ISSN: 1389-1286.

Postel, J. "RFC 925—Multi-LAN Address Resolution" IETF RFC (Oct. 1984), p. 1-4. XP-002218286.

\* cited by examiner

WIRELESS ADAPTOR AND METHOD FOR TRANSMITTING AND RECEIVING MESSAGE

CROSS REFERENCE TO RELATED APPLICATION

This application is a continuation of U.S. patent application Ser. No. 11/311,087, filed Dec. 19, 2005, which is incorporated by reference as if fully set forth.

FIELD OF INVENTION

The present invention relates to a wireless adaptor and a method for transmitting and receiving a message, in particular, to a method for transmitting and receiving the massage via the wireless adaptor with the function of bridge and repeat in a network having an Internet protocol address.

BACKGROUND

For Ethernet that we frequently use, since the message thereof is transmitted via broadcasting, all the nodes would receive the frames while only the frame whose destination address is consistent with the hardware address of the node is acceptable. Hence no matter whichever upper-level protocol is adopted at the upper layer, for example Transmission Control Protocol/Internet Protocol (TCP/IP), if only the Ethernet is adopted in the transmission at the lower layer, the hardware address based on the media access control (MAC) is used.

Generally if the network interface is accepted by the system, then the data would be transmitted and received via the hardware network through the network interface by the datalink, and the Internet protocol (IP) address is unnecessary to be used while the frame is transmitted in the hardware network. However, the transmission is based on IP address when the upper-level protocol TCP/IP is adopted. Thus problem arises therefrom that the hardware address or the protocol address is typically adopted in a corresponding layer and thus here needs an efficient solution for a corresponding transformation between the hardware address and the protocol address in the aspect of transmitting a message.

The advantage of address resolution protocol (ARP) is that the corresponding address relationship thereof is dynamical, that is, the relationship between the IP address and the corresponding hardware address is identified by means of query. When a packet is going to be transmitted from a source host to a destination host, if the corresponding transformation between the IP address and the hardware address for destination host is not obtained from the table in the cache therein, a broadcast packet for an ARP request containing the IP address and the hardware address about the source end is transmitted to the Internet to query the hardware address for the destination host. In the moment, every host being connecting with the Internet receives the broadcast packet and then checks whether the IP address containing in the broadcast packet is consistent with the IP address thereof and, if inconsistency, the broadcast packet is neglected, while an ARP reply is sent in response to the source host to inform the source host the hardware address thereof if consistency.

The bridge device is used to link several small-scale local networks to organize a large-scale local network and to filter the passing message. To achieve the above aspect, the bridge device would judge whether the message is passed to another local network. In specific, the bridge device decides whether the message is passed to other local networks merely upon the hardware address, when an ARP message is passing there through the bridge device. In this case, it lacks not only the capability to integrate the local networks, so as to reduce the number of transmitting ARP requests and to further enhance the transmission efficiency of the network, but also the capability to conceal the hardware address of the source host and to make the source host in server end transmit messages to the network by individual approach which is time consuming.

For overcoming the mentioned drawbacks of the prior art, a novel wireless adaptor and method for transmitting and receiving a message is provided.

SUMMARY

The present invention relates to a wireless adaptor and a method for transmitting and receiving a message, for reducing the requests for the transformation between an Internet protocol (IP) address and a hardware address. The present invention provides a novel device and method for transmitting and receiving the message via the wireless adaptor with the function of bridge and repeat in a network having IP address.

According to the aspect of the present invention, the hardware address and the protocol address in the message are recorded in a table in the bridge device, and the transformation between the bridge hardware address and the hardware address in the message is would proceed based thereon. After the transformation, the message is transmitted.

Therefore the present invention is advantageous in that the hardware address at the client end is able to be concealed. Besides, the integration of the local network and the reduction of the number of transmitting the address resolution protocol requests are achieved, so as to enhance the transmission efficiency of the network.

According to a first aspect of the present invention, a method for transmitting and receiving a message is provided. The method includes steps of providing a bridge device having a bridge hardware address and a first end, receiving a first message including a first hardware address, a first protocol address and a second protocol address from the first end, recording the first hardware address and the first protocol address on a table, replacing the first hardware address with the bridge hardware address, transmitting the first message to a second end having a second hardware address corresponding to the second protocol address; transmitting a second message including the first protocol address, the second protocol address, the bridge hardware address, and the second hardware address from the second end to the bridge device, replacing the bridge hardware address with the first hardware address according to the table, and transmitting the second message to the first end.

Preferably, the bridge device is a wireless bridge.

Preferably, the first end is a client end which is one of an Ethernet end and a wireless adaptor.

Preferably, the second end is a server end.

Preferably, the server end is one of an access point (AP) and a second wireless bridge.

Preferably, the server end includes a dynamic host configuration protocol (DHCP) server.

Preferably, the first message is an address resolution protocol (ARP) packet.

According to a second aspect of the present invention, a bridge device having a bridge hardware address is provided. The bridge device includes a first end receiving a first message including a first hardware address, a first protocol address and a second protocol address from a client end, a table recording the first hardware address and the first protocol address, and a second end receiving a second message including a second hardware address corresponding to the second protocol address from a server end.

Preferably, the transformation between the bridge hardware address and the first hardware address is based on the table. When the first message is received by the first end, the first hardware address is replaced by the bridge hardware address, and when the second message is received by the second end, the bridge hardware address is replaced by the first hardware address.

Preferably, the second message further includes the first protocol address, the second protocol address, and the bridge hardware address.

Preferably, the second message having the second hardware address is transmitted from the first end to the client end.

Preferably, the bridge device is a wireless bridge.

Preferably, the client end is one of an Ethernet end and a wireless adaptor.

Preferably, the second end is one of an access point (AP) and a second wireless bridge.

Preferably, the bridge device is a wireless bridge.

According to a third aspect of the present invention, a bridge device having a bridge hardware address is provided. The bridge device includes a first end receiving a first message having a first hardware address and a first protocol address from a client end, a table recording the first message, a second end receiving a second message having a second hardware address from a server end.

Preferably, the transformation between the bridge hardware address and the first hardware address is based on the table. When the first message is received by the first end, the first hardware address is replaced by the bridge hardware address, and when the second message is received by the second end, the bridge hardware address is replaced by the first hardware address.

Preferably, the first message further includes a second protocol address.

According to a fourth aspect of the present invention, a bridge device having a bridge hardware address is provided. The bridge device includes a table for recording a hardware address and a protocol address in a message.

Preferably, the transformation between the bridge hardware address and the hardware address is based on the table.

Preferably, the bridge device is a wireless bridge.

Preferably, the message is from a client end.

Preferably, the message further includes a second protocol address.

The foregoing and other features and advantages of the present invention will be more clearly understood through the following descriptions with reference to the drawings:

DETAILED DESCRIPTION OF THE PREFERRED EMBODIMENT

The present invention will now be described more specifically with reference to the following embodiments. It is to be noted that the following descriptions of preferred embodiments of this invention are presented herein for the aspect of illustration and description only; it is not intended to be exhaustive or to be limited to the precise form disclosed.

For the sake of efficiently enhancing the transmission efficiency of the network and integrating both local network and wireless network, the present invention provides a novel wireless adaptor and a method for transmitting and receiving a message.

Figure 1:
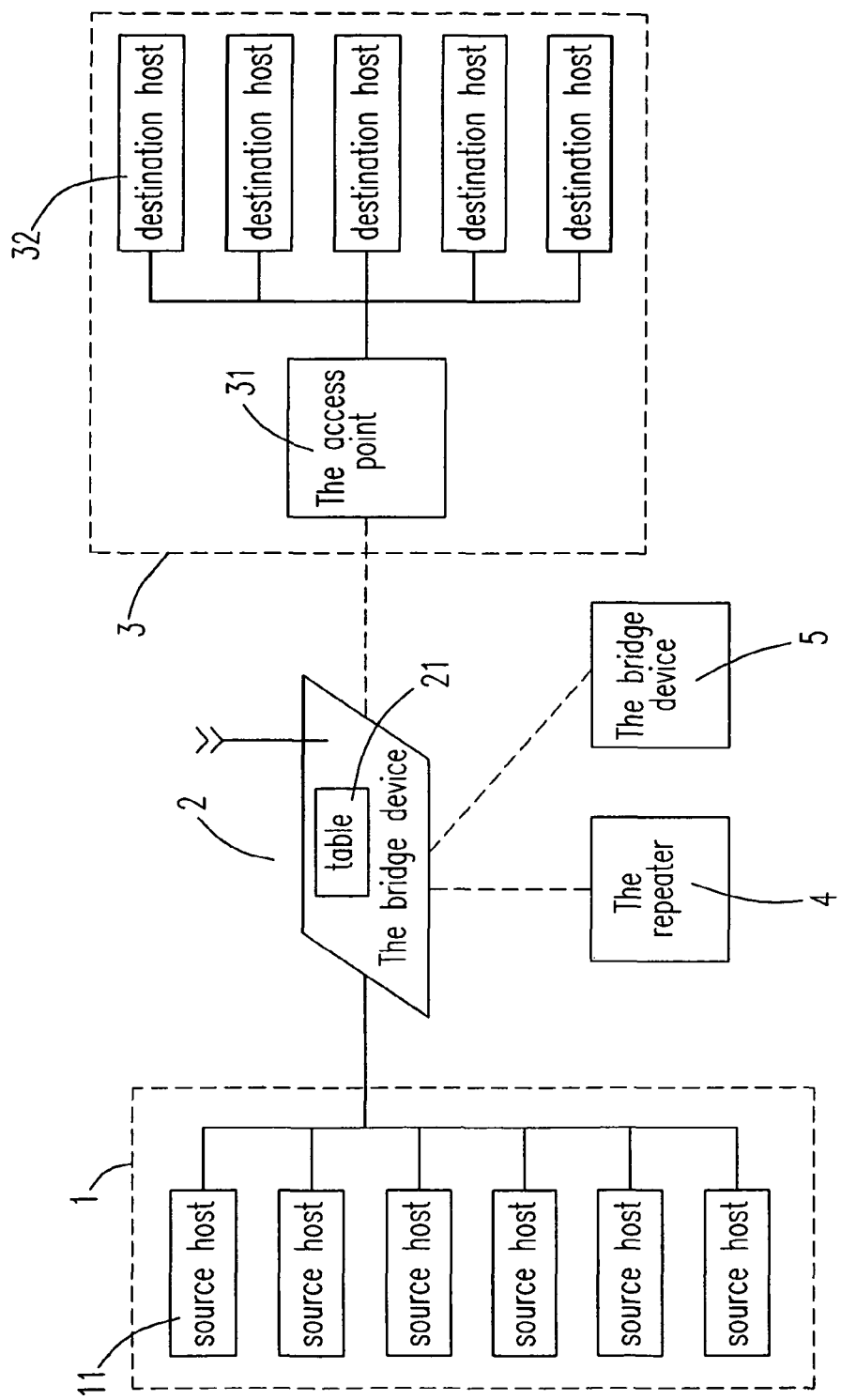
FIG. 1 is a diagram showing the linkage for the device and the method according to a preferred embodiment of the present invention.

Please refer to FIG. 1, which is a diagram showing the linkage for the device and the method according to a preferred embodiment of the present invention, wherein the bridge device 2 at the client end 1 communicates with the access point 31 in the server end 3 via wireless approach. The client end 1 includes a plurality of source hosts 11. The server end 3 equips with a dynamic host configuration protocol (DHCP) server for providing a dynamic address. Further, the bridge device 2 connects not only to an Ethernet in a hardware approach, but also to a repeater 4 or to another bridge device 5 in a wireless approach. Thus according to the implement for the system and the method of the present invention, the bridge device 2 is used to be a communicator to communicate with the server end 3.

According to a preferred embodiment of the present invention, the bridge device 2 is used to transmit and receive a message. The bridge device 2 has a medium access control (MAC) hardware address thereof, which is assumed to be 00,00,00,00,00,01. In this case, the MAC hardware address is termed as a bridge medium access control (BMAC) address for distinguishing it from another MAC address belonging to another hardware interface. One of the main technical features of the present invention is that the MAC address in the source host 11 is replaced with the BMAC address, and then the message is transmitted and received from the server end 3 via the bridge device 2. The present invention will now be described more specifically with reference to the following embodiments.

Figure 2:
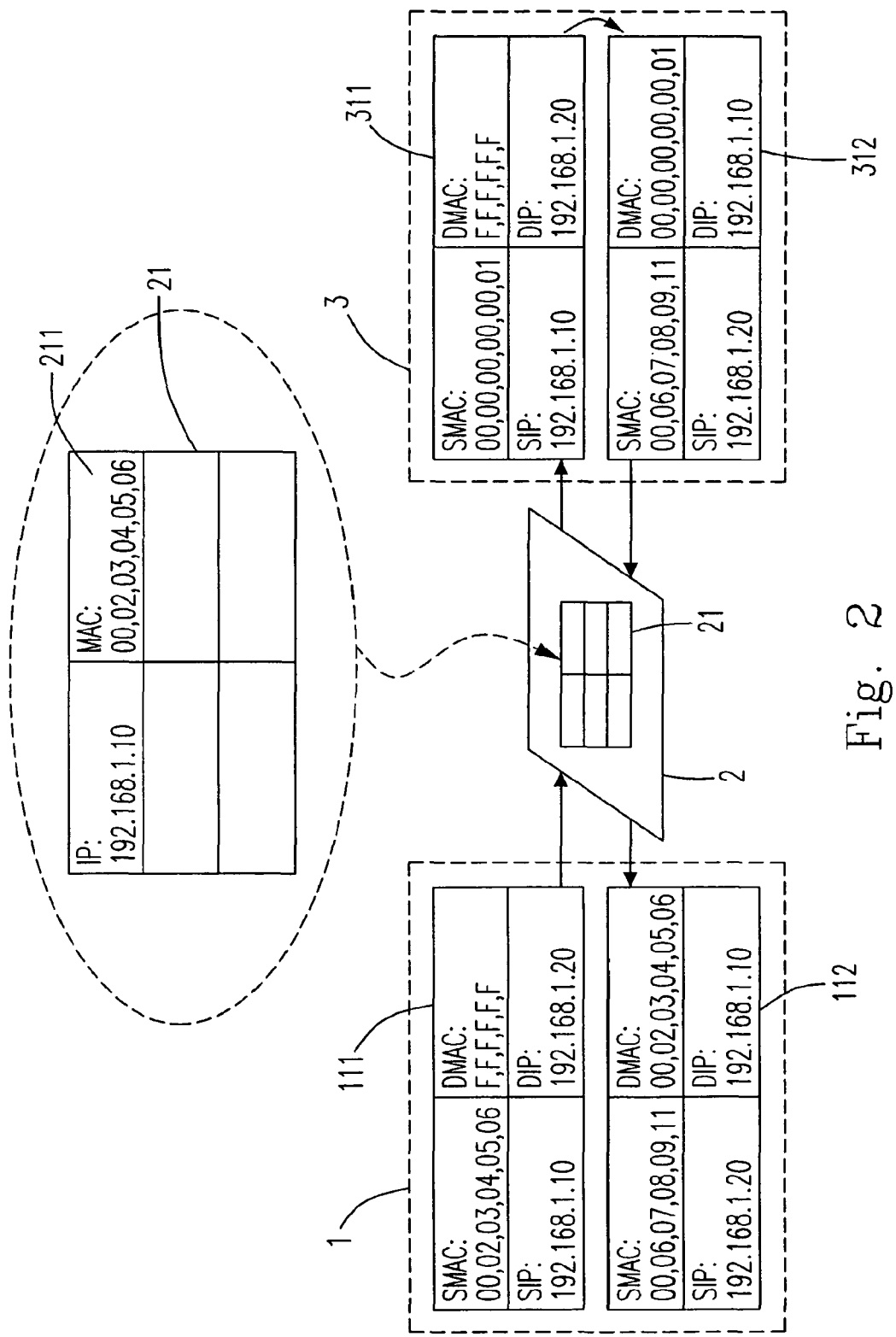
FIG. 2 is a diagram illustrating the message transformation procedures according to the preferred embodiment of the present invention.

Please refer to FIG. 2, which is a diagram illustrating the message transformation procedures according to the preferred embodiment of the present invention. First, an address resolution protocol packet (ARP) 111 is transmitted from the source host 11 at the client end 1. The ARP packet 111 has a source MAC (SMAC) address, a source IP (SIP) and a destination IP (DIP), and lacks a destination MAC (DMAC). Here arises an example to further explain the detail. It is assumed that the ARP packet 111 contains:

| SMAC: 00, 02, 03, 04, 05, 06 | DMAC: F, F, F, F, F, F |
|---|---|
| SIP: 192.168.1.10 | DIP: 192.168.1.20 |

In this case, 00,02,03,04,05,06 is the MAC address of the source host 11, 192.168.1.10 is the IP address of the source host 11, 192.168.1.20 is the IP address of the destination host 32 and F,F,F,F,F,F represents an unknown MAC address for the destination host 32.

Next when the ARP packet 111 is transmitted to the bridge device 2, the MAC 00,02,03,04,05,06 of the source host 11 and the IP 192.168.1.10 of the source host 11 are recorded on the table 21 in the bridge device 2, and are regarded as the message 211. Then the MAC 00,02,03,04,05,06 of the source host 11 is replaced with the BMAC 00,00,00,00,00,01 of the bridge device 2 to be the SMAC and an ARP packet 311 is transformed therefrom. After that the ARP packet 311 is transmitted to an access point 31, wherein the ARP packet 311 contains:

| | |
|---|---|
| SMAC: 00, 00, 00, 00, 00, 01 | DMAC: F, F, F, F, F, F |
| SIP: 192.168.1.10 | DIP: 192.168.1.20 |

After the ARP packet 311 is transmitted to the access point 31, the DMAC 00,06,07,08,09,11 corresponding to the DIP 192.168.1.20 is provided by the access point 31 or the destination host 32 according to the DIP 192.168.1.20 thereof.

Please refer to FIG. 1 and FIG. 2, a message replied from the access point 31 is received by the bridge device 2, namely an ARP reply 312. The ARP reply 312 includes an IP 192.168.1.10 of the original source host 11, an IP 192.168.1.20 of the destination host 31, the BMAC 00,00,00, 00,00,01 of the bridge device 2 and the MAC 00,06,07,08,09, 11 of the previous received destination host. The ARP reply 312 contains:

| | |
|---|---|
| SMAC: 00, 06, 07, 08, 09, 11 | DMAC: 00, 00, 00, 00, 00, 01 |
| SIP: 192.168.1.20 | DIP: 192.168.1.10 |

The MAC of the source host 11 is known according to the massage 211 recorded on the table 21 because the ARP reply 312 includes the IP 192.168.1.10 of the original source host 11. Further the BMAC 00,00,00,00,00,01 is replaced with the MAC 00,02,03,04,05,06 of the source host 11. Thus the final replaced ARP reply 112 contains:

| | |
|---|---|
| SMAC: 00, 06, 07, 08, 09, 11 | DMAC: 00, 02, 03, 04, 05, 06 |
| SIP: 192.168.1.20 | DIP: 192.168.1.10 |

Subsequently, the final replaced ARP reply 112 is transmitted to the client end 1 to obtain the MAC 00,06,07,08,09, 11 of the destination host 32.

According to the above preferred embodiment, the present invention discloses a novel method for obtaining a hardware address of the destination host from the server end via utilizing the wireless adaptor equipped with the bridge and repeat function. Furthermore the hardware address of the client end is able to be concealed through the replacement of the hardware address.

Figure 3:
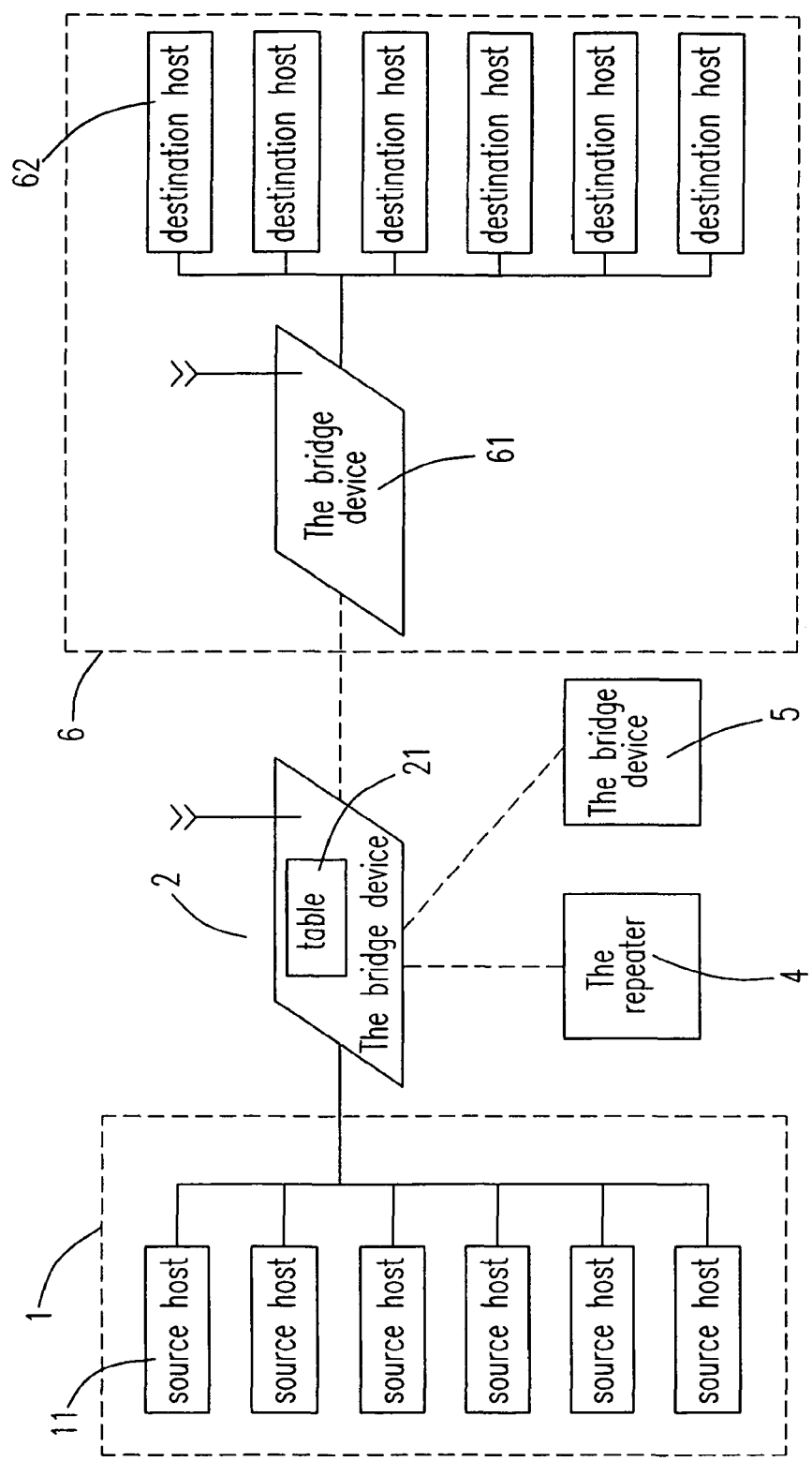
FIG. 3 is a diagram illustrating the linkage for the device and the method according to another preferred embodiment of the present invention.

Please refer to FIG. 3, which is a diagram illustrating the linkage for the device and the method according to another preferred embodiment of the present invention. In this case, the bridge device 2 at the server end communicates with the server end 6 in wireless approach as well, wherein the server end 6 includes another bridge device 61 and a plurality of destination hosts 62 and the server end 6 has a dynamic host configuration protocol server as well. Besides, the bridge device 2 connects not only to a local Ethernet but also to a repeater 4 or another bridge device 5. According to the above preferred embodiment, the person skilled in the art can easily understand that the table 21 in the bridge device 2 is able to be applied to record the message in the repeater 4 or in the bridge device 5. In the same sense, the hardware address of the repeater 4 or the bridge device 5 is replaced with the bridge hardware address as well for transmitting and receiving a message. Thus the present invention really has a technique feature thereof substantially.

To sum up the aforementioned, the present invention provides a method for transmitting a message via utilizing the table in the bridge device for recording a hardware address and an IP address in the massage and replacing the hardware address in the message with the bridge hardware address affiliating to the bridge device. Therefore the method not only integrates both local hardware network and wireless network, but also reduces the number of transmitting the ARP requests. Thus the present invention not only bears a novelty and an obviously progressive nature, but also bears a utility.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims that are to be accorded with the broadest interpretation, so as to encompass all such modifications and similar structures. According, the invention is not limited by the disclosure, but instead its scope is to be determined entirely by reference to the following claims.

What is claimed is:

1. A method for transmitting and receiving a message, comprising steps of
   providing a bridge device having a bridge hardware address and a first end;
   receiving a first message from said first end, wherein said first message comprises a first hardware address, a first protocol address and a second protocol address;
   recording said first hardware address and said first protocol address on a table;
   generating a second message from the first message by only replacing said first hardware address rather than both of the present first hardware address and the present first protocol address, of the first message with said bridge hardware address once receiving said first message;
   transmitting said second message to a second end having a second hardware address corresponding to said second protocol address;
   transmitting a third message from said second end to said bridge device once receiving said transmitted second message, wherein said third message comprises said first protocol address, said second protocol address, said bridge hardware address, and said second hardware address;
   generating a fourth message by replacing said bridge hardware address of the third message with said first hardware address according to said table once receiving said transmitted third message; and
   transmitting said fourth message to said first end.

2. The method according to claim 1, wherein said bridge device is a wireless bridge.

3. The method according to claim 1, wherein said first end is a client end and said client end is one of an Ethernet end and a wireless adaptor.

4. The method according to claim 1, wherein said second end is a server end.

5. The method according to claim 4, wherein said server end is one of an access point (AP) and a second wireless bridge.

6. The method according to claim 4, wherein said server end comprises a dynamic host configuration protocol (DHCP) server.

7. The method according to claim 1, wherein said first message is an address resolution protocol (ARP) packet.

8. A bridge device having a bridge hardware address, comprising:
   a first end receiving a first message from a client end and transmitting a second message to the client end once receiving said first message, wherein said first message comprises a first hardware address, a first protocol address, and a second protocol address;

a table recording said first hardware address and said first protocol address, wherein a transformation between said bridge hardware address and said first hardware address is based on said table; and a second end transmitting a third message to a server end and receiving a fourth message from the server end once said transmitted third message is received by said server end, wherein said fourth message has the first protocol address and a second hardware address corresponding to said second protocol address, wherein when said first message is received by said first end, the third message is generated from the first message by only replacing said first hardware address rather than both of the present first hardware address and the present first protocol address, of the first message by said bridge hardware address, and when said fourth message is received by said second end, said bridge hardware address of the fourth message is replaced by said first hardware address to generate the second message.

9. The device according to claim 8, wherein said second message further comprises said first protocol address, said second protocol address, and said bridge hardware address.

10. The device according to claim 8, wherein said second message having said second hardware address is transmitted from said first end to said client end.

11. The device according to claim 8, wherein said bridge device is a wireless bridge.

12. The device according to claim 8, wherein said client end is one of an Ethernet end and a wireless adaptor.

13. The device according to claim 8, wherein said second end is one of an access point (AP) and a second wireless bridge.

14. A bridge device having a bridge hardware address, comprising:

a first end receiving a first message from a client end and transmitting a second message to the client end once receiving said first message, wherein said first message has a first hardware address and a first protocol address;

a table recording said first message, wherein a transformation between said bridge hardware address and said first hardware address is based on said table; and a second end transmitting a third message to a server end and receiving a fourth message from the server end once said transmitted third message is received by said server end, wherein said fourth message has the first protocol address and a second hardware address, wherein, when said first message is received by said first end, the third message is generated from the first message by only replacing said first hardware address rather than both of the present first hardware address and the present first protocol address, of the first message by said bridge hardware address, and when said fourth message is received by said second end, said bridge hardware address of the fourth message is replaced by said first hardware address to generate the second message.

15. The device according to claim 14, wherein said first message further comprises a second protocol address.

* * * * *